UNITED STATES PATENT OFFICE.

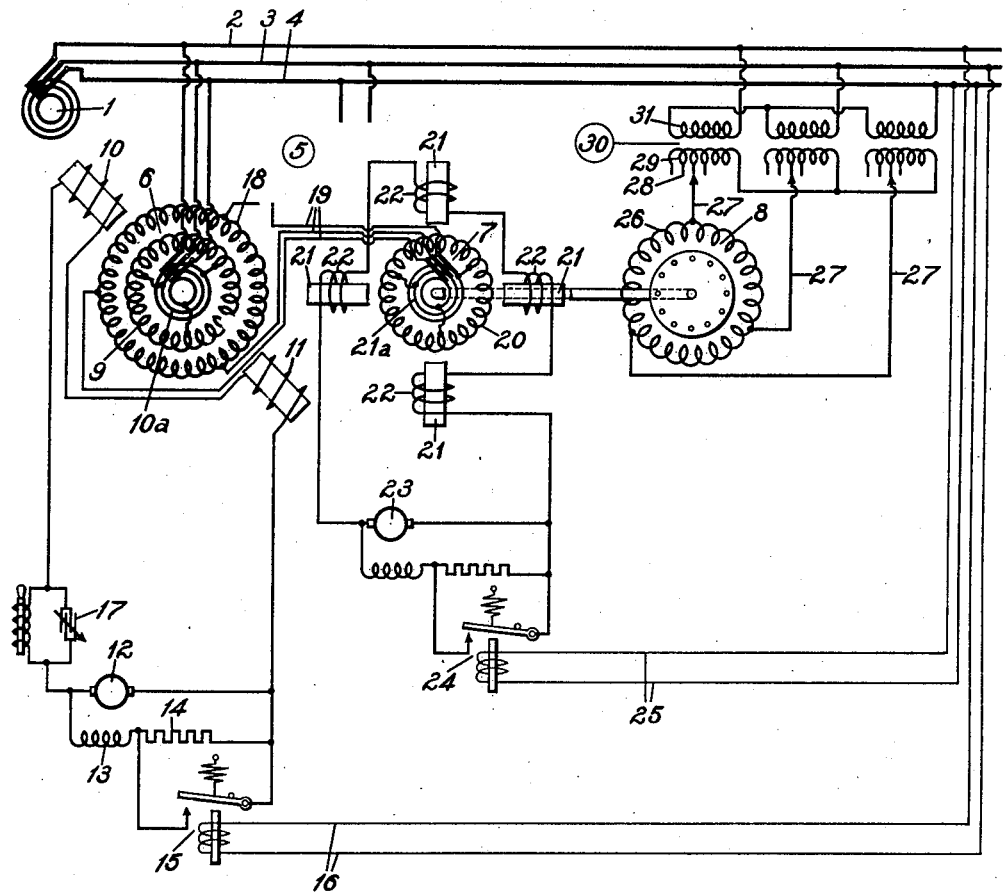

CHARLES LE G. FORTESCUE, OF PITTSBURGH, PENNSYLVANIA, ASSIGNOR TO WEST-INGHOUSE ELECTRIC & MANUFACTURING COMPANY, A CORPORATION OF PENNSYLVANIA.

PHASE DISTRIBUTING SYSTEM.

1,376,423.     Specification of Letters Patent.     Patented May 3, 1921.

Application filed November 18, 1916, Serial No. 132,089. Renewed October 9, 1920. Serial No. 415,952.

*To all whom it may concern:*

Be it known that I, CHARLES LE G. FORTESCUE, subject of the King of England, and a resident of Pittsburgh, in the county of Allegheny and State of Pennsylvania, have invented a new and useful Improvement in Phase Distributing Systems, of which the following is a specification.

My invention relates to electrical distributing systems and it has special relation to polyphase transmission systems embodying distributing circuits and phase-balancing means for maintaining symmetrical polyphase conditions in the systems.

It is desirable to so select the loads on the several phases of a polyphase-distributing system as to prevent excessive unbalancing of the phase-voltages and currents. Unless such care is exercised, the transmission system will not operate economically and its ultimate load capacity will be considerably reduced. Moreover, polyphase apparatus designed for balanced voltages and currents will be adversely affected when connected to an unbalanced polyphase system. For instance, undesirable temperatures may develop in portions of the polyphase apparatus unless the windings of such apparatus are specially designed to carry unbalanced currents. Again, emergency conditions frequently demand that two or more polyphase systems be interconnected to effect an interchange of electrical energy between them. But it is objectionable and inefficient to do this when one of the systems is considerably unbalanced because the unbalanced system will reflect its unbalanced conditions upon any satisfactorily balanced system which may be connected to it.

It is well known that an ideal phase-balancer will also serve as a phase-splitter or converter to transform a single-phase current into balanced polyphase currents, and vice versa. Of course, when performing this function, the phase-balancer is operating under such special conditions as may be represented by a phase-balancer that is connected to a polyphase system in which all of the loads are connected to a single phase thereof, or by a phase-balancer employed to maintain balanced polyphase conditions at a point in a normally balanced polyphase system that is connected to a single-phase system from which part of the power is supplied. While one phase is loaded to the exclusion of the other phases, all of the phases contribute equal amounts of power to the loaded phase through the intermediary of the phase-balancing means and vice versa. Since the phase balancer thus automatically effects an equal division of power among the several phases of a polyphase system, it may also be considered as a phase-splitter or a phase-converter.

One object of my invention is to provide a phase-balancing means of the character above mentioned which will also serve, when special conditions require, as a phase-converter. The phase-balancing means of the present invention will also automatically effect an equal division of the load among the several phases of a polyphase system, irrespective of the loading of the several phases, the power-factors of the loads and other asymmetrical conditions obtaining therein.

For a better understanding of the nature and scope of my invention, reference may be had to the following description and the accompanying drawing, the single figure of which is a diagrammatic representation of a polyphase-distributing system embodying a form of the present invention.

Any unbalanced polyphase electromotive forces or currents, which may be represented by a system of vectors of different magnitudes but capable of forming a closed polygon, may be resolved into two component systems of balanced vectors. One of the component systems of balanced vectors, which I will designate as the load component, has the same phase-rotation as that of the resultant system of unbalanced vectors, and the other component system of balanced vectors, which I will designate as the unbalancing component, has a phase rotation opposite to that of the resultant system.

In an unbalanced polyphase power system, the unbalancing component of the electromotive forces which, as stated above, constitutes a balanced polyphase system of vectors of phase rotation opposite to that of the system, will be proportional to the product of the corresponding unbalancing component of the polyphase currents and the impedance of the system offered to the flow of these unbalancing-component currents. The relative division of the unbalancing component of the currents among the various polyphase machines connected to the polyphase system will depend upon the respective impedances of said machines offered to the flow of the currents forming the unbalancing component. Synchronous machines and induction motors offer a very low impedance to the flow of these counter-rotating or unbalancing-component currents, and, hence, such devices, connected in the polyphase system at points where there is a concentration of unbalancing load, are liable to be overloaded.

The aforementioned unbalancing component represents the extent of the unbalancing conditions existing in a polyphase system in which the loads of the several phases are not chosen so that each phase of the system supplies equal quantities of power. If polyphase machines connected to the polyphase system were so designed that they offered zero impedance to the unbalancing component of the polyphase currents obtaining in the system, the said machines would serve as ideal phase balancers since, as will be hereinafter explained, the unbalancing component of the load would be completely eliminated.

When an unbalanced load is supplied from a polyphase system, all the polyphase rotating machines connected to the system tend to act as balancers in order to keep the phase voltages and phase currents in balanced relations so that symmetrical polyphase conditions may be approached at the main bus-bars. In particular, symmetrical polyphase machines of low impedance, such as synchronous motors, rotary converters and induction motors, tend to maintain balanced conditions on a polyphase system independently of the load imposed on them.

To understand the theory of operation of the phase balancer of the present invention, assume that a single-phase synchronous generator is a polyphase synchronous generator subjected to certain unbalanced-load conditions. The polyphase generator supplying the unbalanced load, in this instance, may be considered as being a three-phase generator having zero current flowing in one of its circuits and currents equal to the single-phase load current flowing in any two of the circuits, the line current obtaining in one of said circuits flowing in a direction opposite to that obtaining in the other circuit. The generator comprises a rotating armature winding connected to the unbalanced polyphase system and a stationary field element on which a polyphase amortisseur or auxiliary winding is disposed.

Since, as mentioned above, an unbalanced polyphase load may be resolved into two component loads, one, the load component, having normal phase rotation and the other, the unbalancing component, having counter-phase rotation, synchronous rotating magneto-motive forces having normal phase rotation and synchronous rotating magneto-motive forces having counter-phase rotation are generated within the machine by reason of the unbalanced currents obtaining in said armature winding. The synchronous rotating magneto-motive forces of normal-phase rotation are stationary with respect to the said amortisseur winding, while the counter-phase rotating magneto-motive forces, which have the same direction of rotation as that of the armature winding relative to the amortisseur winding, generate double-synchronous-frequency currents in the amortisseur winding. The double-frequency currents thus induced generate polyphase magneto-motive forces which approximate, in value, the magneto-motive forces generated by the unbalancing-component currents flowing in the armature winding. However, the magneto-motive forces generated by these induced currents in the amortisseur winding are not exactly equal to the magneto-motive forces inducing them, because the magnetic coupling or mutual induction between the main or armature winding and the amortisseur winding is not entirely perfect. If it were possible to make this magnetic coupling completely perfect, and if the resistances of the amortisseur and armature windings did not impede the flow of the unbalancing-component currents, no reactions to these counter-phase rotating currents would exist and, therefore, the electromotive forces of the generator would be balanced.

It is desirable to prevent double-frequency currents from being induced in the direct-current field winding of the machine because, if these currents obtain therein, they will react on the main winding of the machine in an undesirable manner.

From the foregoing analysis of a single-phase generator, it is evident that a single-phase impedance comprises two elements, namely, the effective impedance of the generator, considered as a polyphase machine, to the normal-phase rotating or load component and the effective impedance to the counter-phase rotating or unbalancing component of the load. The former is the impedance of the machine offered to the flow of symmetrical polyphase currents of positive phase rotation and the latter is the impedance of the machine offered to the flow of symmetrical polyphase currents of counter-phase rotation.

The impedance offered by a dynamo-electric machine to the flow of counter-phase rotational currents may be made extremely low by carefully designing the aforementioned polyphase amortisseur or damper winding. If, in addition, auxiliary means be provided, externally or internally of the machine, to assist the natural action of the machine as a phase-balancer, the admittance of the machine to the counter-phase rotational or unbalancing-component currents may be made infinite so that the terminal voltages of the machine will be absolutely balanced, irrespective of the values of the counter-phase rotational currents tending to flow through the machine.

The ability of an ordinary dynamo-electric machine, such as a polyphase induction machine or a polyphase synchronous machine, to perform the functions of a balancer is measured by the impedance offered by the machine to the counter-phase rotational component of the unbalanced load. Therefore, the action of such an unassisted machine, when connected to an unbalanced polyphase system, consists in supplying counter-phase rotational currents of such values or the unbalancing component of the load in such an amount as will bring the system and the machine to the same degree of unbalancing. The voltage balance of the system is thereby improved at the expense of the voltage balance of the machine. The voltages that cause unbalancing at the machine terminals are the impedance-drops resulting from the counter-phase rotational currents supplied by the machine and are, therefore, counter-phase rotational symmetrical polyphase voltages. Therefore, if means are provided for reducing to zero the effective impedance offered to the flow of the unbalancing component of the currents in the polyphase system, the phases of said system would be strictly maintained in symmetrical relationship.

By means of my present invention, balanced-polyphase conditions may be maintained in a polyphase-distributing system by neutralizing the magneto-motive forces set up in a machine by the unbalancing component of the currents obtaining in the system. In other words, the impedance offered to the flow of the unbalancing-component currents through my phase balancer will be reduced to zero. In order to neutralize the magneto-motive forces resulting from the unbalancing-component currents and thereby maintain only balanced-polyphase conditions on the supply system, under all conditions, I provide a phase-balancer that comprises a main dynamo-electric machine in which polyphase currents of the proper frequency, magnitude, phase displacement and power factor are introduced so that the aforementioned unbalancing-component currents may flow through the main dynamo-electric machine with zero impedance, irrespective of the load conditions obtaining in the power system. As a result, the terminal voltages of the main machine of my phase-balancer are automatically maintained in symmetrical relationship, irrespective of the distribution of the loads in the several phases in the distributing system.

Other features of novelty in my invention will be pointed out with particularity in the claims annexed to, and forming a part of, the specification.

Referring to the drawing, a source 1 of alternating current is connected to polyphase mains 2, 3 and 4 of an electric power-distributing system. It is assumed that unbalanced-load conditions are imposed on this distributing system and, in consequence thereof, the symmetrical relation between the voltages of the several phases is destroyed. Since the voltages are unsymmetrical, unbalanced currents will obtain in the several phases of the system.

In order to correct this unbalancing of the voltages between the distributing mains, I provide a phase-balancer 5 which, in this instance, comprises a main synchronous dynamo-electric machine 6, an auxiliary synchronous dynamo-electric machine 7 and a propelling means for the auxiliary machine 7 which, in this instance, is an induction motor 8. The rotor of the main machine 6 comprises a polyphase winding 9 that is connected, through slip rings 10$^a$, to the distributing mains 2, 3 and 4. The field element of the main machine 6 comprises a single pair of poles that are provided with field coils 10 and 11. These field coils are excited by means of an exciter 12 having a field winding 13 and a resistor 14 connected in series therewith the effective value of which is controlled by means of a vibrating contact regulator 15 of the Tirrill type.

A vibrating electromagnet of the regulator 15 is excited by means of leads 16 which, in turn, are connected across the phase 3—4 of the distributing system. A parallel resonant shunt device 17 is connected in series with the direct-current field winding of the synchronous machine 6 in order to preclude currents of a certain frequency from flowing therethrough, as will be hereinafter described.

The stator of the main machine 6 is also provided with a polyphase amortisseur winding 18 that is connected, through properly disposed taps, to leads 19. It is apparent that the rotor winding 9 of the main machine 6 is subjected to the excitations arising from both the direct-current, salient-pole field winding comprising the coils 10 and 11 and the polyphase amortisseur winding 18.

The auxiliary dynamo-electric machine 7 comprises a polyphase rotor winding 20 that has its terminals connected to slip rings 21$^a$ which, in turn, are connected to the leads 19. The rotor winding 20, therefore, of the auxiliary machine is directly connected to the polyphase amortisseur winding 18 of the main machine 6. The stator of the auxiliary machine 7 comprises four salient-pole members 21 and windings 22 therefor, which are similar to the usual poles of synchronous machines. The auxiliary machine 7 is provided with four salient poles in order that the currents generated in the rotor winding 20 may have twice the frequency of the currents traversing the rotor winding 9 of the main machine 6. In other words, the currents generated by the auxiliary machine are double-frequency currents with respect to the currents obtaining in the distributing system.

The field coils 22 of the auxiliary machine 7 are supplied with exciting current from an exciter 23 which is similar in all respects to the exciter 12. The excitation of the field winding of the exciter 23 is also controlled by a vibrating contact regulator 24, the vibrating magnet of which is excited through leads 25 that are connected to the phase 2—4 of the distributing system.

The auxiliary machine 7, which acts as a generator, is propelled by the induction motor 8. An exciting winding 26 of the induction motor 8 is connected, through leads 27, to adjustable taps 28 formed on the secondary windings 29 of a three-phase transformer 30. Primary windings 31 of the three-phase transformer are connected to the three phases of the distributing system. Since the induction motor 8 must operate the auxiliary machine 7 at a constant speed, it is necessary for the motor 8 to operate at a constant slip under all conditions. To vary the torque developed by the motor 8 and, at the same time, permit the motor to operate at a constant speed, I have shown its exciting winding 26 as supplied with adjustable means for varying the electromotive forces which are to be impressed thereupon. To increase the value of the torque developed by the motor 8, therefore, the voltage impressed upon the winding 26 must be increased while the speed of the motor 8 remains constant. This is only one method of varying the torque that is developed by an induction motor while maintaining the speed or slip of the motor constant. Another well known means for accomplishing this result is to connect adjustable resistor elements in the rotor winding. In this instance, the torque will be varied by varying the resistance of the winding of the rotor element.

To understand the operation of my phase-balancing means, consider that the unbalanced-load conditions obtaining in the distributing system cause unbalanced voltages to be impressed upon the terminals of the rotor winding 9 of the main machine 6. The resultant unbalanced polyphase currents flowing in the several phases of the winding 9 generate two component synchronously rotating systems of balanced polyphase magneto-motive forces, one component system having the same phase rotation as the direction of rotation of the rotor winding 9 and the other component system having a phase rotation which is opposite to the direction of rotation of the rotor winding 9.

The balanced component system of magneto-motive forces having a phase rotation that is opposite to the direction of rotation of the rotor winding 9 is the one that I have previously designated as being the load component. The balanced component system having the same phase rotation as the direction of rotation of the rotor winding 9, that is, a counter-phase rotation, is the one that I have previously designated as being the unbalancing component. Therefore, the load-component system of magneto-motive forces is stationary with respect to the stator and the auxiliary amortisseur winding 18, while the unbalancing system of magneto-motive forces rotates at double-synchronous frequency relative to the amortisseur winding 18. As a result, the load-component system of magneto-motive forces induces no alternating currents in the stator windings while the unbalancing load-component system of magneto-motive forces induces double-frequency polyphase currents in the amortisseur winding 18.

Double-frequency currents are precluded from flowing in the coils 10 and 11 of the direct-current field winding of the machine 6 because the parallel resonant shunt 17 is inserted in series therewith and tuned to twice double-synchronous frequency.

As mentioned above, if, under all conditions, the effective impedance offered to the flow of the unbalancing-component currents by the main machine 6 is reduced to zero, the voltages across the terminals of the main machine 6 will be maintained in symmetrical relationship, which conditions will be reflected upon the distributing system, thereby maintaining balanced polyphase conditions therein.

The effective impedance offered by the main machine 6 to the unbalancing-component currents may be resolved into two components, one being a purely inductive reactance and the other being represented by a resistance-drop. The former is entirely a wattless component while the latter is a watt component. The impedance offered by the winding 9 to the unbalancing currents may, therefore, be neutralized by subjecting the system of balanced polyphase magneto-motive forces generated by these unbalancing-component currents to another system of magneto-motive forces of the proper frequency, magnitude, power-factor and phase displacement. These counterbalancing magneto-motive forces represent the necessary wattless component and the necessary watt component required for reducing the aforesaid reactive and resistance components to zero.

The unbalancing-component system of magneto-motive forces in the main machine induces double-frequency polyphase currents in the amortisseur winding 18, and the magneto-motive forces arising therefrom tend to react upon the said inducing magneto-motive forces to reduce them to zero, in accordance with a well known principle. Because of the imperfect magnetic coupling between the inducing winding 9 and the induced winding 18, the double-frequency currents induced in the latter winding are not of sufficient magnitude to completely neutralize the unbalancing-component system of magneto-motive forces. To this end, counter-phase, rotating, double-frequency currents, which comprise the wattless components and the watt components of proper values, are introduced into the winding 18 in order to augment the double-frequency currents induced therein.

The over-excited synchronous auxiliary machine 7 generating double-frequency currents of low power factor, in this instance, such a power factor, for example, as is occasioned by a leading current, provides the wattless components of the currents employed for neutralizing the inductive reactance offered to the flow of the unbalancing-component currents by the main machine 6, while the torque developed in the induction motor 8 and transmitted through its shaft to the synchronous generator 7, supplies the watt components of the currents employed for neutralizing the ohmic-drop offered to the flow of the unbalancing-component currents by the main machine 6.

The induction motor 8 is designed to give, at its maximum supplied voltage, sufficient torque to furnish the power required to overcome the watt or energy component or the resistance-drop obtaining in the machine 6 by reason of the flow therein of the unbalancing-component currents of maximum value. As stated above, the machine 8 operates at a constant slip and at the proper speed to generate double-frequency currents in the rotor winding 20 of the main machine 6.

The neutralizing wattless components are supplied to the main machine 6 by the over-excited synchronous generator 7. To change the value of the energy component supplied to the main machine 6, the voltage impressed upon the exciting winding 26 of the induction motor 8 is varied, and to vary the wattless component delivered to the main machine 6, the excitation of the auxiliary machine is varied.

To initiate the balancing action, the excitation of the auxiliary machine 7 is varied until the closest proximity to a balance is obtained. To further improve the balance, the voltage impressed upon the motor 8 is changed until true symmetrical polyphase conditions obtain in the distributing system.

It may be advisable to so design the motor 8 that, at minimum voltage, it will drive the auxiliary machine 7 at its proper speed and supply its no-load losses. When minimum voltage is impressed on the induction motor 8, the torque developed thereby is at its minimum value and is sufficient only to supply the no-load losses of the auxiliary machine 7 and the small energy component of the compensating currents supplied to the main machine 6.

While I have shown and described one form of my invention, it will be obvious to those skilled in the art that it is not limited to the specific form shown but is susceptible of various changes and modifications that do not depart from the spirit and scope of the appended claims.

I claim as my invention:

1. A system of distribution comprising polyphase mains, a main polyphase dynamo-electric machine having one of its windings connected thereto and a second polyphase winding in inductive relation to said first winding, an auxiliary over-excited synchronous dynamo-electric machine for furnishing polyphase currents to said second winding of the main machine, an induction motor for driving said auxiliary machine, means for impressing an adjustable voltage on said induction motor and means for adjusting the field strength of said auxiliary machine, said last two machines in conjunction furnishing compensating currents to the main machine in order to reduce the impedance offered by said main machine thereof to the flow of the unbalancing component currents obtaining in the polyphase mains to zero.

2. A system of distribution comprising polyphase mains, a main dynamo-electric machine connected thereto, an auxiliary over-excited synchronous dynamo-electric machine for supplying compensating currents to the main machine in order to neutralize the reactance offered thereby to the unbalancing-component currents obtaining in the polyphase mains, and a constant-speed induction machine for driving said auxiliary machine and supplying compensating torque thereto in order to neutralize the ohmic drop offered by said main machine to the unbalancing-component currents obtaining in the polyphase mains.

3. A system of distribution comprising polyphase mains, a main dynamo-electric machine connected thereto, an over-excited synchronous dynamo-electric machine for supplying double-frequency compensating currents to the main machine in order to neutralize the reactance offered thereby to the unbalancing-component currents obtaining in the polyphase mains, and an induction machine for driving said auxiliary machine and supplying compensating torque thereto in order to neutralize the ohmic resistance offered by said main machine to the unbalancing-component currents.

4. A system of distribution comprising polyphase mains, a main synchronous dynamo-electric machine connected thereto having a polyphase amortisseur winding, an auxiliary over-excited synchronous dynamo-electric machine for supplying double-frequency compensating currents to the said amortisseur winding, adjustable means for propelling said auxiliary machine at a constant speed, and means for varying the excitation of said auxiliary machine and for varying the torque developed by said propelling means in order to reduce the impedance offered by the main machine to the flow therethrough of unbalancing-component currents obtaining in the polyphase mains to zero.

5. A system of distribution comprising polyphase mains, a main polyphase dynamo-electric machine connected thereto having a polyphase amortisseur winding, and means for supplying double-frequency leading currents to said amortisseur winding in order to neutralize both the reactive drop and the resistance drop offered by said main machine to the unbalancing-component currents obtaining in the distributing system.

6. A system of distribution comprising polyphase mains, a main polyphase dynamo-electric machine connected thereto having a polyphase amortisseur winding, means for supplying double-frequency low power-factor currents to said amortisseur winding, and means for varying the power-factor of said double-frequency currents in order to reduce the impedance offered by said main machine to the flow therethrough of the unbalancing-component currents obtaining in the polyphase mains to zero.

7. In a phase balancer, the combination with a main polyphase dynamo-electric machine having one winding adapted for connection to polyphase mains, and a second winding inductively related to the first winding, of an auxiliary over-excited synchronous machine for supplying double-frequency currents to said second winding of the main machine, an induction motor for driving said auxiliary machine, means for varying the excitation of said auxiliary machine, and additional means for varying the torque developed by said induction motor in order that the impedance offered by the main machine to the flow therethrough of unbalancing-component currents of synchronous frequency may be reduced to zero.

8. In a phase balancer, the combination with a main polyphase dynamo-electric machine, and an over-excited synchronous auxiliary machine for supplying double-frequency alternating currents thereto, of an induction motor for driving said auxiliary machine, said induction motor operating at a constant slip, and means for varying the torque developed by said induction motor.

9. In a phase balancer, the combination with a main polyphase dynamo-electric machine, and an auxiliary synchronous machine for supplying double-frequency currents thereto, of means for varying the power-factor of the double-frequency currents generated in the auxiliary machine, and means for varying the torque by which said auxiliary machine is propelled.

10. In a phase balancer, the combination with a main polyphase dynamo-electric machine, and means for supplying double-frequency currents thereto, of means for varying the wattless component and the watt component of said double-frequency currents.

11. In a phase balancer, the combination with a main polyphase synchronous machine, and means for supplying leading double-frequency currents to one winding thereof, and means for varying the wattless component and the watt component of said double-frequency currents.

12. In a phase balancer, the combination with a main polyphase dynamo-electric machine having one of its windings adapted for connection to polyphase mains, and a second winding in inductive relation thereto, and means for supplying double-frequency alternating currents to said second winding, of means for varying the power-factor of said double-frequency currents in accordance with the unbalancing-component currents traversing said first winding of the main machine.

13. In a phase balancer, the combination with a polyphase dynamo-electric machine, an auxiliary synchronous dynamo-electric machine for supplying double-frequency, counter-phase, rotating alternating currents to one winding thereof, of means for varying the excitation of said auxiliary machine, propelling means for the auxiliary machine that operates at a constant speed, and means for varying the torque developed by said propelling means in order to vary the power component of the double-frequency currents generated thereby.

14. A system of distribution comprising polyphase mains, a main dynamo-electric machine connected thereto, an auxiliary over-excited synchronous dynamo-electric machine for supplying compensating currents to the main machine in order to neutralize the reactance offered thereby to the unbalancing-component currents obtaining in the polyphase mains, and an induction machine for driving said auxiliary machine and supplying compensating torque thereto in order to neutralize the ohmic drop offered by said main machine to the unbalancing-component currents obtaining in the polyphase mains.

In testimony whereof, I have hereunto subscribed my name this 30th day of Oct., 1916.

CHARLES LE G. FORTESCUE.